United States Patent
Tornkvist et al.

(10) Patent No.: US 8,442,486 B2
(45) Date of Patent: May 14, 2013

(54) METHOD, APPARATUS AND COMPUTER PROGRAM PRODUCT FOR ONLINE CHARGING

(75) Inventors: Robert Tornkvist, Karlshamn (SE); Juergen Bos, Aachen (DE); Stefan Karlsson, Karlskrona (SE); Damir Svoboda, Wuerselen (DE); Christoph Sous, Wuerselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 950 days.

(21) Appl. No.: 12/158,853

(22) PCT Filed: Dec. 18, 2006

(86) PCT No.: PCT/EP2006/069851
§ 371 (c)(1),
(2), (4) Date: Oct. 29, 2008

(87) PCT Pub. No.: WO2007/071651
PCT Pub. Date: Jun. 28, 2007

(65) Prior Publication Data
US 2009/0163172 A1    Jun. 25, 2009

(30) Foreign Application Priority Data
Dec. 23, 2005   (EP) .................... 05028295

(51) Int. Cl.
*H04M 11/00*   (2006.01)
*H04M 15/00*   (2006.01)
*G07F 19/00*   (2006.01)
*G06Q 40/00*   (2012.01)
*G06F 17/00*   (2006.01)
*G06G 7/00*   (2006.01)

(52) U.S. Cl.
USPC ........ 455/406; 379/114.01; 705/400; 705/34; 705/40

(58) Field of Classification Search .......... 455/405–408, 455/410, 411, 432.1
See application file for complete search history.

(56) References Cited

U.S. PATENT DOCUMENTS

| | | |
|---|---|---|
| 6,556,820 B1 * | 4/2003 | Le et al. .............. 455/411 |
| 2002/0068545 A1 * | 6/2002 | Oyama et al. .......... 455/406 |
| 2004/0247100 A1 * | 12/2004 | Hakala et al. ......... 379/114.01 |
| 2006/0286963 A1 * | 12/2006 | Koskinen et al. ...... 455/405 |
| 2007/0041536 A1 * | 2/2007 | Koskinen et al. ...... 379/114.28 |

OTHER PUBLICATIONS

ETSI TS 132 296 V6.2.0 (Sep. 2005) Technical Specification 4 Digital cellular telecommunications system (Phase 2+); Universal Mobile Telecommunications System (UMTS); Telecommunication management; Charging management; Online Charging System (OCS): Applications and interfaces (3GPP TS 32.296 version 6.2.0 Release 6).*

(Continued)

*Primary Examiner* — Kent Chang
*Assistant Examiner* — Nathan Brittingham

(57) ABSTRACT

A method and apparatus for invoking online charging of a service requested via a communications network and to be accessed according to a first protocol, wherein subscriber information is received from a first network element (102) including information for invoking the online charging, and the received subscriber information is interpreted and in response to a service request online charging is invoked from a second network element (103) for the service by means of a second protocol.

11 Claims, 2 Drawing Sheets

OTHER PUBLICATIONS

Ilgu et al., Studies on Services with CAMEL features in 3G, The 14'h IEEE 2003 International Symposium on Personal, Indoor and Mobile Radio Communication Proceedings.*

Ilgu Jung et al: "Studies on services with CAMEL features in 3G" Personal, Indoor and Mobile Radio Communications, 2003. PIMRC 2003. 14th IEEE Proceedings on Sep. 7-10, 2003, Piscataway, NJ, USA, IEEE, vol. 2, Sep. 7, 2003.

"Digital cellular telecommunications system (Phase 2+)" ETSI Standards, European Telecommunications Standards Institute, Sphia-Antipo, FR, vol. 3-SA5, No. V620, Sep. 2005.

Dokko S et al: "An implementation of prepaid service in cdma PCS system" IEEE, Sep. 28, 1999.

* cited by examiner

METHOD, APPARATUS AND COMPUTER PROGRAM PRODUCT FOR ONLINE CHARGING

TECHNICAL FIELD OF THE INVENTION

The present invention relates to a method and apparatus for online charging of a service in a communications network.

DESCRIPTION OF RELATED ART

Online charging in 3rd Generation Partnership Project (3GPP) based networks are made using Customised Applications for Mobile network Enhanced Logic (CAMEL) for Circuit Switched (CS) calls. CAMEL is a network feature that is used as a powerful mechanism to let the operator introduce new services without impacting the core network. CAMEL is a set of GSM standards designed to work on a GSM core network. They allow an operator to define services over and above standard GSM services. It is particularly effective in allowing these services to be offered when a subscriber is roaming. The CAMEL architecture is based on the Intelligent Network (IN) standards, and uses the CAP protocol. Because of its generic nature, CAMEL tends to consume a lot of processor load and signaling resources in the involved network nodes. It also only allows one type of CAMEL service per triggering. This makes it very difficult for a subscriber to have both CAMEL based online charging and another CAMEL service simultaneously. Online charging involves credit-control, which is a mechanism that directly interacts in real-time with an account and controls or monitors the charges related to the service usage. It is also a process of checking whether credit is available, credit-reservation, deduction of credit from the end user account when service is completed and refunding of reserved credit that is not used.

However, the network elements do not support credit control and does not have any means for triggering a credit control request (CCR) towards an Online Charging System. In prior art systems supplementary services (SS), for example Call Forwarding, are triggered by means of an SS-code. Unfortunately, to introduce a new trigger for Diameter Credit-Control (DCC) would mean that both the Home Location Register (HLR) and mobile services switching centre (MSC) would have to be updated, and thereby either single vendor solutions or time consuming standardisation work would be required. This will even more increase the processor load and the required signalling resources.

The problem with using DCC is that it is not standardized in 3GPP. This means that the network elements do not support DCC and does not have any means of triggering a DCC request towards an Online Charging System.

This means that a serving element, e.g. an MSC, does not implement DCC. Furthermore, there is no support in the HLR to initiate any other service control than CAMEL.

SUMMARY OF INVENTION

According to some embodiments of the invention, a method for invoking online charging of a service requested via a communications network and which is intended to be accessed according to a first protocol, wherein subscriber information is received from a first network element (102) including information for invoking the online charging, comprises:

interpreting the received subscriber information and in response to a service request invoking online charging from a second network element (103) for the service by means of a second protocol.

According to some embodiments of the invention, an apparatus for online charging of a service in a communications network comprises a programmable apparatus configured to provide access to network services according to a first protocol and to invoke online charging of a service requested via a communications network, wherein the programmable apparatus is adapted to receive subscriber information from a first network element including information for invoking the online charging. The method is characterised in that the apparatus is configured to interpret the received subscriber information and in response to a service request invoke online charging from a second network element for the service by means of a second protocol.

According to an embodiment of the invention a computer program comprises instructions for causing a computer to perform the process of the method according to the embodiments of the invention when said program is run on a computer.

According to an embodiment of the invention the computer program may be embodied on a record medium, stored in a computer memory, embodied on a read-only memory, or carried on an electrical carrier signal.

According to an embodiment of the invention the computer program product may comprise a computer readable medium, having thereon: computer program code means, when said program is loaded, to make the computer execute the process of the method according to the embodiments of the invention.

Further embodiments are defined by the dependent claims.

An advantage of the invention is that it requires no updates in the HLR.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION OF PREFERRED EMBODIMENTS

Figure 1:
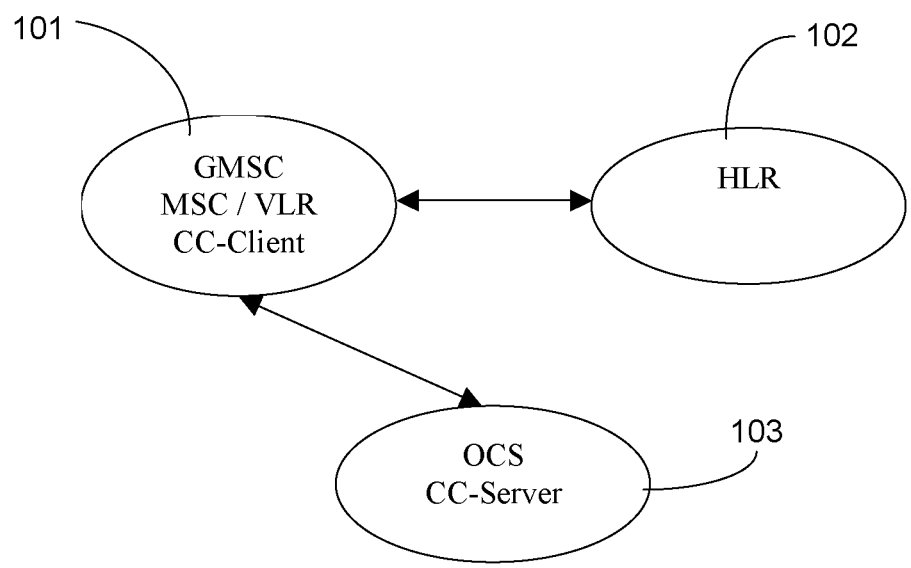
FIG. 1 shows an embodiment of a part of a 3rd Generation Partnership Project (3GPP) based communications network.

FIG. 1 shows an embodiment of a part of a 3rd Generation Partnership Project (3GPP) based communications network, i.e. a 3rd Generation Mobile System based on the evolved GSM core networks, in which the method and apparatus according to the invention is adapted to operate. It is a service providing network, facilitating service delivery to users in the communications network.

The communications network comprises, among other network elements, a gateway mobile services switching centre ((G)MSC) 101, including a visitors location register VLR and a credit control client (CC-Client); a home location register (HLR) 102; and an Online Charging System (OCS) 103 including a credit control server (CC-Server).

The (G)MSC provides the network with specific data about individual mobile phones and operates as an interface towards other networks such as other PLMNs, ISDN or the public switched network (PSTN). Moreover, the (G)MSC comprises a programmable apparatus or a data processing system, including a computer processor for executing computer programs and processing data, and storage means connected to the computer processor for storing data on a storage medium.

The visitors location register (VLR) contains relevant data of all mobiles currently located or roaming within the serving (G)MSC 101. The VLR has to support the (G)MSC 101 during call establishment when a call is coming from for example a mobile telephone.

The home location register (HLR) 102 stores the identity and user data of all the subscribers belonging to the area of the related (G)MSC 101. The HLR 102 provides the (G)MSC 101 with the necessary subscriber data when a call is coming from a public switched network (PSTN), the Internet etc.

Online charging in 3GPP based networks is made using Customised Applications for Mobile network Enhanced Logic (CAMEL) for Circuit Switched (CS) calls. CAMEL allows roaming subscribers access to their Intelligent Network (IN) services. CAMEL connects the home and visited mobile networks to various Intelligent Network (IN) platforms used throughout national networks to provide features such as Pre-Paid Calling, personal Numbering and more complex location dependent services. The Online charging involves credit-control, which is a mechanism that directly interacts in real-time with an account and controls or monitors the charges related to the service usage. It is also a process of checking whether credit is available, credit-reservation, deduction of credit from the end user account before, during and when service is completed and refunding of reserved credit that is not used.

Online charging may be provided by a Diameter Credit Control (DCC) Application, which utilizes the mechanisms provided by the Diameter Base protocol to provide real-time credit control to the service charging in IP networks. The Credit Control Application supports functionality for service charging with credit reservation, direct debiting and refunding, service price enquiry and subscriber's account balance check, wherein the subscribers ability to pay for a service is secured.

DCC for CS calls is however not standardized in 3GPP. This means that the network elements configured for CAMEL do not support the DCC protocol and does not have any means for triggering or invoking a DCC request (CCR) towards an Online Charging System.

A subscriber in the communications network can access CAMEL services for circuit switched (CS) calls by special CAMEL subscription information (CSI), herein referred to CAMEL triggers. CAMEL Subscription Information (CSI) is used together with a service control point (SCP) address. According to some embodiments of the present invention certain CAMEL triggers are used to trigger DCC based online charging in the credit control server (CC-Server) of Online Charging System (OCS) 103 instead. By using the "Service Key" or "SCP Address" which is contained in the CAMEL triggers, the network element can determine if the service that the user tries to access is DCC Online Charging or something different, like a CAMEL service, i.e. an IN service. It will thereby be possible to also trigger a CAMEL service which is being charged online.

Although not standardized in 3GPP and therefore not present in all network elements, Online charging by means of DCC according to the embodiments of the invention reduces processor load and required signalling resources for credit control. The HLR 102 may send the CSI to the MSC 101, and the MSC 101 will act on the information when a call is made and trigger the OCS 103.

Figure 2:
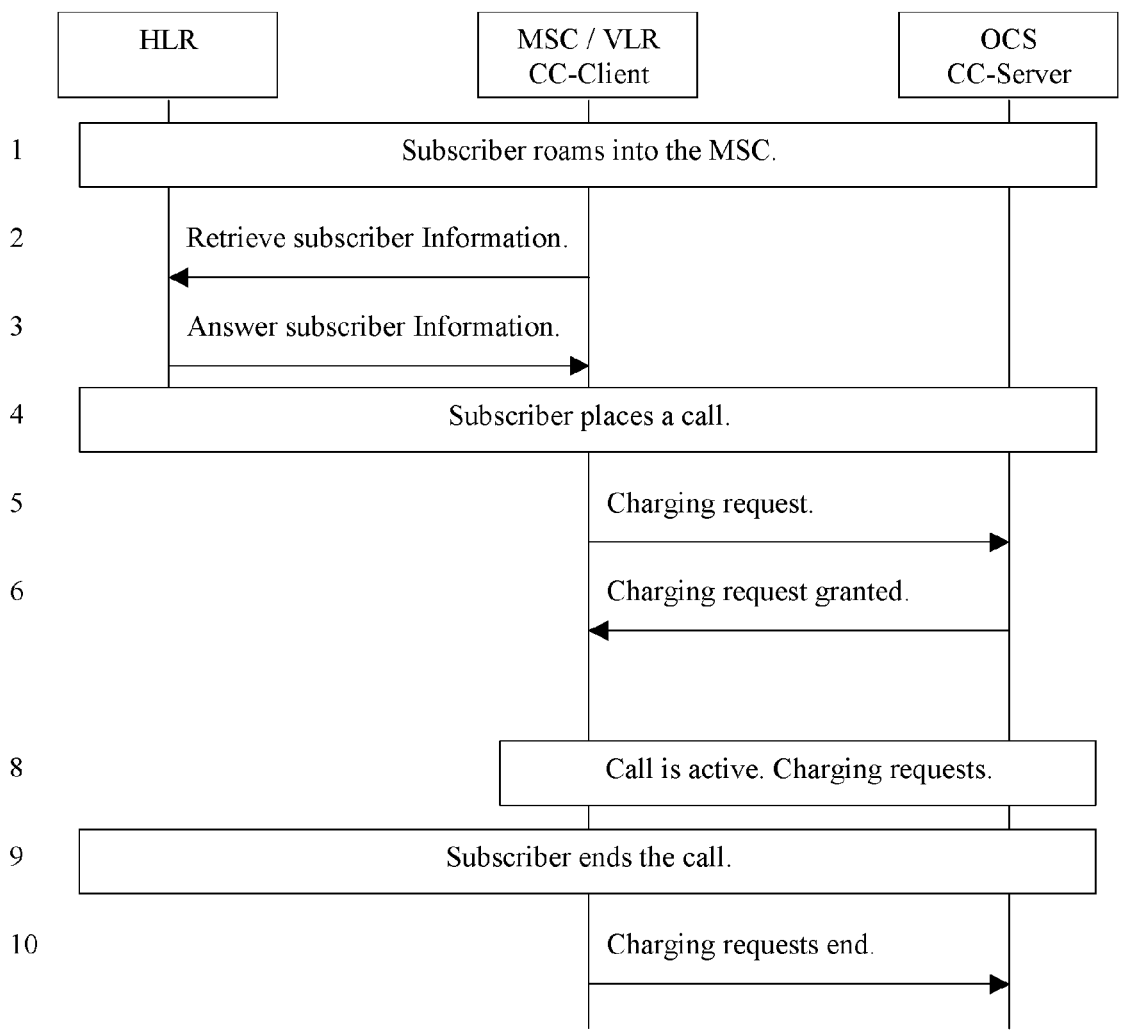
FIG. 2 is a flow diagram of an embodiment of the method for online charging according to the present invention.

An embodiment of the method for online charging according to the present invention is described with reference to the flow diagram of FIG. 2.

A subscriber roams in to the area covered by the MSC 101 in step 1. The VLR of MSC 101 requests the subscriber information needed from the HLR 102 in step 2. The information about the subscriber is sent to the VLR, including CSI, Service Key and SCP Address in step 3. In step 4, the subscriber places a call.

An optionally check is performed to determine if the dialled number is a special number e.g. voice mail or customer services. If that is the case then no triggering of charging (using DCC) is requested. It is also checked if CSI, Service Key, and SCP Address are received. If they are not, then no triggering of charging (using DCC) is requested. However, if CSI is received a check is performed of either Service Key or SCP Address or both towards a list of Service Keys or SCP addresses that should trigger charging (using DCC). If there is a match then charging (using DCC) should be triggered otherwise not. If Online Charging via DCC is triggered, potentially remaining CAMEL triggers can still invoke other CAMEL services.

Based on the CSI, Service Key and/or SCP Address the MSC 101 determines in step 5 that this CSI could not trigger a CAMEL invocation but instead sends a charging request via DCC to the OCS 103. The charging request is granted in step 6, and the call is allowed to continue.

The exchange of charging information continues as long as the call is active in step 8. In step 9, the subscriber ends the call and MSC 101 ends the dialogue with the OCS 103 in step 10.

The advantages with using the CAMEL triggers is that these are already available in most HLRs. This means that they will work with most vendors. Due to the fact that the MSCs that do not support DCC will use the CAMEL triggers as usual without no extra configuration. Hence, it will support networks with MSCs from different vendors. The same is applicable for roaming.

Although the invention has been described in conjunction with specific embodiments thereof this invention is susceptible of embodiments in different forms, with the understanding that the present disclosure is to be considered as an exemplification of the principles of the invention and is not intended to limit the invention to the specific embodiments illustrated. The embodiment of the method has been described in conjunction with an originating service, i.e a subscriber placing a call, but the principle is of course likewise applicable for terminating services or other originating services.

Moreover, the embodiments have been described with reference to the CAMEL application protocol, CAP, as a first protocol and the Diameter Credit Control online charging protocol, but the invention may be implemented with other similar protocols within the scope of the invention. Hence, other kinds of subscriber information than the CSI can be used.

Although the embodiments of the invention described with reference to the drawings comprise a computer apparatus and processes performed in the computer apparatus, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal.

The invention claimed is:

1. A method for invoking online charging of a service requested via a communications network and which is intended to be accessed according to a first protocol, Customized Applications for Mobile network Enhanced Logic (CAMEL), the method comprising: receiving subscriber information from a first network element including information for invoking the online charging; interpreting the received subscriber information for detecting certain CAMEL triggers; and, in response to a service request, invoking, using the detected certain CAMEL triggers, online charging from a second network element for the service by means of a second protocol, wherein the second protocol is a Diameter Credit Control based online charging protocol.

2. The method according to claim 1, wherein the subscriber information is CAMEL subscription information.

3. The method according to claim 1, wherein the service request is an intelligent network service request.

4. The method according to claim 1, wherein the CAMEL subscriber information is received from a home location register.

5. The method according to claim 2, wherein the step of receiving the subscriber information comprises receiving one or both a service control point address and a Service Key.

6. The method according to claim 5, wherein the step of interpreting comprises:
    determining if online charging shall be initiated based on one or both the service control point address the Service Key.

7. A programmable apparatus configured to provide access to network services according to a first protocol, Customized Applications for Mobile network Enhanced Logic (CAMEL), and to invoke online charging of a service requested via a communications network, the programmable apparatus comprising:
    means for receiving subscriber information from a first network element including information for invoking the online charging, means for interpreting the received subscriber information for detecting certain CAMEL triggers; and, in response to a service request, means for invoking, using the detected certain CAMEL triggers, online charging from a second network element for the service by means of a second protocol, wherein the second protocol is a Diameter Credit Control based online charging protocol.

8. The apparatus according to claim 7, wherein the first the subscriber information is CAMEL subscriber information.

9. The apparatus according to claim 7, wherein the service request is an intelligent network service request.

10. The apparatus according to claim 7, wherein the programmable apparatus is a mobile switching centre adapted to:
    receive CAMEL subscriber information from a home location register.

11. The apparatus according to claim 7, wherein the subscriber information comprises one or both a service control point address and a Service Key, and the programmable apparatus is configured to determine if online charging shall be initiated based on one or both of the service control point address and the or a Service Key.

* * * * *